United States Patent
Zhu et al.

(10) Patent No.: US 11,252,300 B2
(45) Date of Patent: *Feb. 15, 2022

(54) TRAINING AND UPSCALING OF LARGE SIZE IMAGE

(71) Applicants: Sony Corporation, Tokyo (JP); Sony Pictures Entertainment Inc., Culver City, CA (US)

(72) Inventors: Miaoqi Zhu, Studio City, CA (US); Yoshikazu Takashima, Los Angeles, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/442,131

(22) Filed: Jun. 14, 2019

(65) Prior Publication Data

US 2020/0126184 A1 Apr. 23, 2020

Related U.S. Application Data

(60) Provisional application No. 62/747,453, filed on Oct. 18, 2018.

(51) Int. Cl.
*G06T 7/11* (2017.01)
*H04N 1/60* (2006.01)
(Continued)

(52) U.S. Cl.
CPC ......... *H04N 1/6027* (2013.01); *G06K 9/4652* (2013.01); *G06K 9/6256* (2013.01);
(Continued)

(58) Field of Classification Search
CPC ......... G06T 7/11; G06T 3/4046; G06T 9/002; G06T 2207/20021; G06T 2207/20081;
(Continued)

(56) References Cited

U.S. PATENT DOCUMENTS 5,237,624 A * 8/1993 Okamoto ............... G06K 15/00
358/447
8,395,708 B2 3/2013 Lee
(Continued)

FOREIGN PATENT DOCUMENTS

EP 1164781 A1 12/2001
JP 6349703 B2 6/2015
(Continued)

OTHER PUBLICATIONS

Dong et al., "Image Super-Resolution Using Deep Convolutional Networks", IEEE, arXiv:1501.00092v3 [cs CV] Jul. 31, 2015; pp. 1-14.
(Continued)

*Primary Examiner* — Sheela C Chawan
(74) *Attorney, Agent, or Firm* — Procopio, Cory, Hargreaves & Savitch LLP

(57) ABSTRACT

Training and upscaling a large-sized input image, including: dividing the large-sized input image into a plurality of small-sized sub-pictures; expanding each sub-picture of the plurality of small-sized sub-pictures using target padding pixels to produce an expanded sub-picture; upscaling each sub-picture using an ML-based upscaler to produce an expanded upscaled sub-picture; cropping the expanded upscaled sub-picture to an upscaled size equal to an original size of each sub-picture multiplied by an upscaling factor; repeating expanding, upscaling, and cropping for the plurality of sub-pictures; and concatenating the plurality of cropped sub-pictures to produce an output image.

20 Claims, 8 Drawing Sheets

(51) Int. Cl.
| | |
|---|---|
| *G06K 9/46* | (2006.01) |
| *G06T 3/40* | (2006.01) |
| *G06N 3/02* | (2006.01) |
| *G06N 20/00* | (2019.01) |
| *G06K 9/62* | (2022.01) |
| *G06T 9/00* | (2006.01) |
| *G06T 7/13* | (2017.01) |
| *G06T 5/00* | (2006.01) |
| *G06T 5/10* | (2006.01) |

(52) U.S. Cl.
CPC .............. *G06N 3/02* (2013.01); *G06N 20/00* (2019.01); *G06T 3/4046* (2013.01); *G06T 3/4053* (2013.01); *G06T 3/4076* (2013.01); *G06T 5/003* (2013.01); *G06T 5/10* (2013.01); *G06T 7/11* (2017.01); *G06T 7/13* (2017.01); *G06T 9/002* (2013.01); *G06T 2207/10024* (2013.01); *G06T 2207/20021* (2013.01); *G06T 2207/20081* (2013.01); *G06T 2207/20084* (2013.01)

(58) Field of Classification Search
CPC .......... G06T 2207/20084; G06T 7/13; G06T 3/4053; G06T 5/003; G06T 5/10; G06T 2207/10024; G06K 9/6256; G06K 9/4652; G06N 3/02; G06N 20/00
USPC ....... 382/299, 298, 266, 232, 224, 203, 190, 382/199, 181, 155
See application file for complete search history.

(56) References Cited

U.S. PATENT DOCUMENTS

| | | | |
|---|---|---|---|
| 8,494,308 B2 | 7/2013 | Pan | |
| 9,865,037 B2 | 1/2018 | Salvador Marcos | |
| 10,032,256 B1 * | 7/2018 | Anaya | G06T 5/002 |
| 10,091,479 B2 | 10/2018 | Barron et al. | |
| 2004/0218834 A1 * | 11/2004 | Bishop | H04N 19/97 382/299 |
| 2013/0028538 A1 | 1/2013 | Simske et al. | |
| 2013/0223734 A1 | 8/2013 | Tuzel et al. | |
| 2014/0267283 A1 | 9/2014 | Nystad et al. | |
| 2015/0117762 A1 * | 4/2015 | Shibata | G06T 5/50 382/159 |
| 2017/0132759 A1 * | 5/2017 | Perez Pellitero | G06T 3/4053 |
| 2017/0256033 A1 | 9/2017 | Tuzel | |
| 2019/0045168 A1 * | 2/2019 | Chaudhuri | H04N 5/23232 |
| 2020/0051211 A1 | 2/2020 | Shiokawa | |
| 2020/0126183 A1 * | 4/2020 | Zhu | G06N 3/02 |

FOREIGN PATENT DOCUMENTS

| | | |
|---|---|---|
| JP | 6349703 B2 * | 7/2018 |
| WO | WO2017124036 A1 | 7/2017 |

OTHER PUBLICATIONS

Shcherbinin et al., "Sharpening Image Details Using Local Phase Congruency Analysis", Society for Imaging Science and Technology, https://doi.org/10.2352/ISSN.2470-1173.2018.13.IPAS-218; pp. 218-1-218-5.
International Search Report and Written Opinion in related PCT Application No. PCT/US2019/056675, dated Jan. 16, 2020, 7 pages.
Wikipedia, Luma (Vidso), published on Dec. 13, 2017 (Year: 2017).
Wikipedia, YCbCr, published on Oct. 3, 2017 (Year: 2017).
Uchida et al., "Non-blind image restoration based on convolutional neural network." In 2018 IEEE 7th Global Conference on Consumer Electronics (GCCE), pp. 40-44, Oct. 9-12, 2018, Nara, Japan.

* cited by examiner

TRAINING AND UPSCALING OF LARGE SIZE IMAGE

CROSS-REFERENCE TO RELATED APPLICATIONS

This application claims the benefit of priority under 35 U.S.C. § 119(e) of U.S. Provisional Patent Application No. 62/747,453, filed Oct. 18, 2018, entitled "Machine-Learning Based Single Image Upscaling Application for Motion Pictures." The disclosure of the above-referenced application is incorporated herein by reference.

BACKGROUND

Field

The present disclosure relates to training and upscaling images, and more specifically, to training and upscaling a large-sized input image.

Background

Machine learning (ML) can be used to perform image super-resolution upscaling. However, the conventional ML-based training and upscaling process has some observed issues. For example, the memory size required for ML-based training and upscaling increases exponentially when the target image size increases, especially with deep neural networks having many layers. To maintain the required memory size in practical range while using an advanced neural network-based training and upscaling process, a method which is independent from the input/output image size is desired.

SUMMARY

The present disclosure provides for training and upscaling a large-sized input image.

In one implementation, a method for training and upscaling a large-sized input image is disclosed. The method includes: dividing the large-sized input image into a plurality of small-sized sub-pictures; expanding each sub-picture of the plurality of small-sized sub-pictures using target padding pixels to produce an expanded sub-picture; upscaling each sub-picture using an ML-based upscaler to produce an expanded upscaled sub-picture; cropping the expanded upscaled sub-picture to an upscaled size equal to an original size of each sub-picture multiplied by an upscaling factor; repeating expanding, upscaling, and cropping for the plurality of sub-pictures; and concatenating the plurality of cropped sub-pictures to produce an output image.

In one implementation, expanding each sub-picture includes: determining how to pad the extra pixels around each sub-picture; and adding sub-regions of the extra pixels around each sub-picture. In one implementation, adding sub-regions includes determining a type for each of the sub-regions. In one implementation, a first type of the sub-regions includes the sub-regions with pixels that are entirely within an active picture area of the large-sized image. In one implementation, the method further includes extending each sub-picture into directions of the sub-regions when the sub-regions are determined to be of the first type. In one implementation, a second type of the sub-regions includes the sub-regions with pixels that are not within an active picture area of the large-sized image but are on edges of each sub-picture. In one implementation, the method further includes extending each sub-picture using a butterfly image over the edges when the sub-regions are determined to be of the second type. In one implementation, a third type of the sub-regions includes the sub-regions with pixels that are not within an active picture area of the large-sized image but are on corners of each sub-picture. In one implementation, the method further includes extending sub-picture using a butterfly image over the corners when the sub-regions are determined to be of the third type.

In another implementation, a large-sized image upscaling system is disclosed. The system includes: an image divider configured to divide a large-sized input image into a plurality of sub-pictures; a sub-picture extender configured to extend each sub-picture of the plurality of sub-pictures by adding extra pixels around each sub-picture to produce an expanded sub-picture, wherein the expanded sub-picture is fed into a neural network to train and upscale the expanded sub-picture; a sub-picture cropper configured to receive and crop the expanded and upscaled sub-picture to a size corresponding to the size of an original sub-picture multiplied by an upscaling factor; and an image filler configured to concatenate all cropped sub-pictures of the plurality of sub-pictures to reconstruct an output image.

In one implementation, the sub-picture extender adds the extra pixels around each sub-picture by adding sub-regions of the extra pixels around each sub-picture. In one implementation, adding sub-regions includes determining a type for each of the sub-regions. In one implementation, a first type of the sub-regions includes the sub-regions with pixels that are entirely within an active picture area of the large-sized input image. In one implementation, the sub-picture extender is further configured to extend each sub-picture into directions of the sub-regions when the sub-regions are determined to be of the first type. In one implementation, a second type of the sub-regions includes the sub-regions with pixels that are not within an active picture area of the large-sized input image but are on edges of each extended sub-picture. In one implementation, the sub-picture extender is further configured to extend each sub-picture using a butterfly image over the edges when the sub-regions are determined to be of the second type. In one implementation, a third type of the sub-regions includes the sub-regions with pixels that are not within an active picture area of the large-sized input image but are on corners of each extended sub-picture. In one implementation, the sub-picture extender is further configured to extend each sub-picture using a butterfly image over the corners when the sub-regions are determined to be the third type.

In yet another implementation, a non-transitory computer-readable storage medium storing a computer program to train and upscale a large-sized input image is disclosed. The computer program includes executable instructions that cause a computer to: divide the large-sized input image into a plurality of small-sized sub-pictures; expand each sub-picture of the plurality of small-sized sub-pictures using target padding pixels to produce an expanded sub-picture; upscale each sub-picture using an ML-based upscaler to produce an expanded upscaled sub-picture; crop the expanded upscaled sub-picture to an upscaled size equal to an original size of each sub-picture multiplied by an upscaling factor; repeat executable instructions that cause the computer to expand, upscale, and crop the plurality of sub-pictures; and concatenate the plurality of cropped sub-pictures to produce an output image.

In one implementation, the executable instructions that cause a computer to expand each sub-picture include executable instructions that cause a computer to: determine how to pad extra pixels around each sub-picture; and add sub-regions of the extra pixels.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, the conventional ML-based training and upscaling process has some observed issues. For example, the memory size required for ML-based training and upscaling increases exponentially when the target image size increases, especially with deep neural networks having many layers. To maintain the required memory size in practical range while using an advanced neural network-based training and upscaling process, a method which is independent from the input/output image size is desired.

To address the above-stated issues with the conventional process, certain implementations of the present disclosure provide for: (1) dividing a large-sized input image into multiple small-sized sub-pictures; (2) expanding each sub-picture by target padding pixels around the sub-picture; (3) upscaling the expanded sub-picture; (4) cropping out the image area from the expanded and upscaled sub-picture; and (5) concatenating the cropped sub-picture images to re-construct the output upscaled image.

After reading these descriptions, it will become apparent how to implement the disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

Figure 1A:
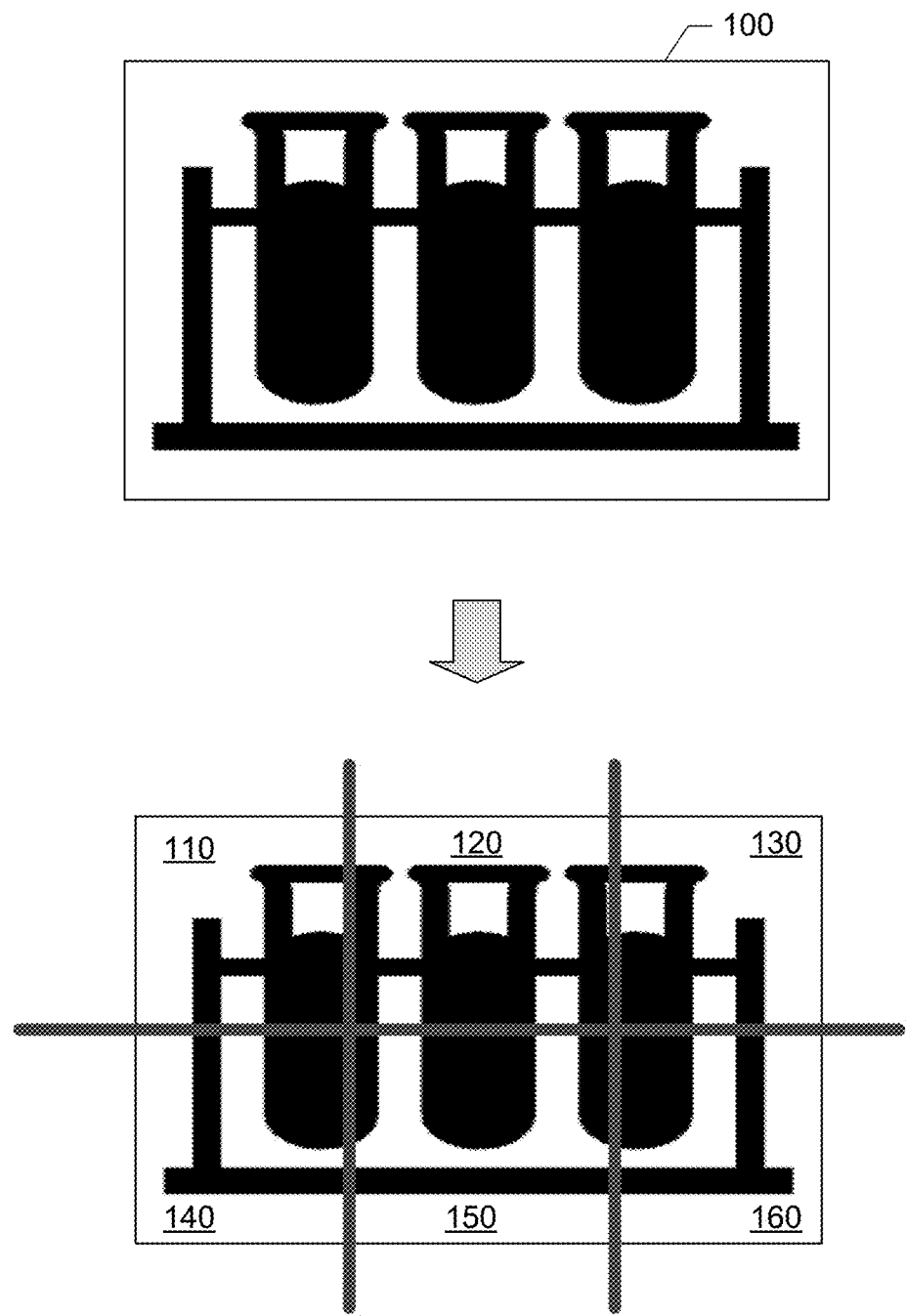
FIG. 1A shows a large-sized input image divided into six small-sized sub-pictures.
Figure 1B:
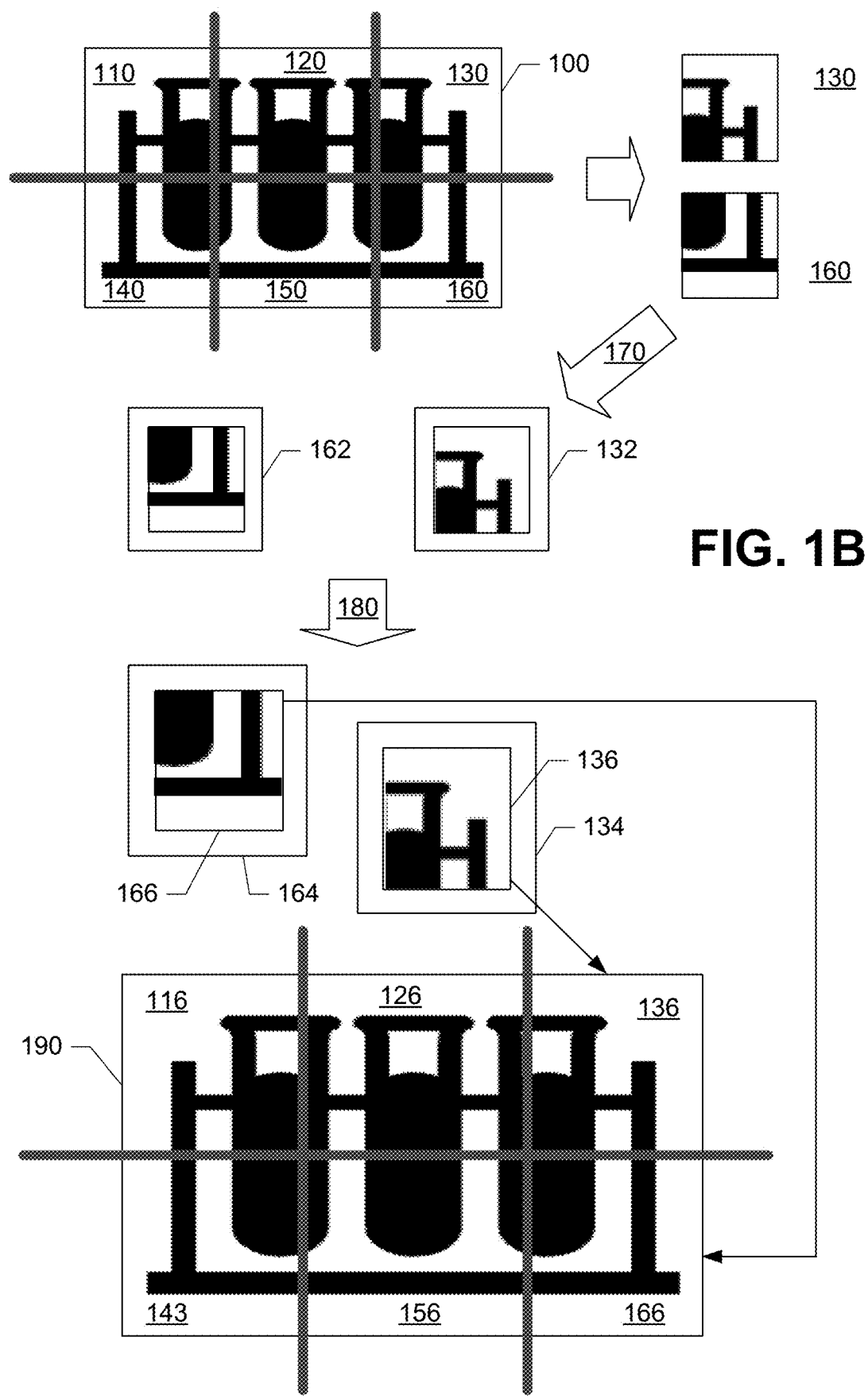
FIG. 1B shows the processing of the sub-pictures and forming the output image from the sub-pictures.

FIGS. 1A and 1B form a flow diagram illustrating a process for training and upscaling a large-sized image in accordance with one implementation of the present disclosure. In one implementation, large-sized images include images that are high definition (HD) or higher. For example, an HD image can be defined as having a resolution of 1920×1080 pixels, while a higher resolution image, such as 4K, can be defined as having a resolution of 3840×2160 pixels. Thus, an HD or 4K image can be classified as being a large-sized image, which cannot be processed as one single input image to a complex neural network layer for training.

The illustrated implementation of FIG. 1A shows a large-sized input image 100 divided into six small-sized sub-pictures 110, 120, 130, 140, 150, 160. FIG. 1B shows the processing of the sub-pictures and forming the output image from the sub-pictures. FIG. 1B shows the process for two of the six sub-pictures. However, the other four sub-pictures can be processed similarly to the process for the two sub-pictures shown.

Regarding how small a small-sized sub-picture needs to be depends on the memory size and the complexity of the neural network used in training. That is, the larger memory size allows the processing with larger-sized sub-pictures, while more complex neural network requires smaller-sized sub-pictures. In one example, the maximum size of the sub-picture that can be sent for training is 64×64 or 128×128 pixels.

In the illustrated implementation of FIG. 1B, each 130, 160 of the sub-pictures is separately processed. Initially, each sub-picture is expanded by target padding pixels around the sub-picture using an expansion process 170. This expansion process 170 is illustrated in FIG. 2 and is described in detail in the description section for FIG. 2.

In the illustrated implementation of FIG. 1B, each sub-picture is padded (by the expansion process 170) to form an expanded sub-picture 132, 162. The expanded sub-picture 132, 162 is then upscaled (by a neural network-based upscaling process 180). Thus, in the upscaling process 180 of FIG. 1B, the required memory size is defined by the size of each sub-picture and the complexity of the neural network, rather than the size of entire input image.

FIG. 1B shows the expanded and upscaled sub-picture 134, 164. Each of the expanded and upscaled sub-picture 134, 164 is cropped to produce the original image area of the sub-picture 136, 166. The cropped sub-picture images 116, 126, 136, 146, 156, 166 are concatenated to re-construct the output upscaled image 190.

Figure 2:
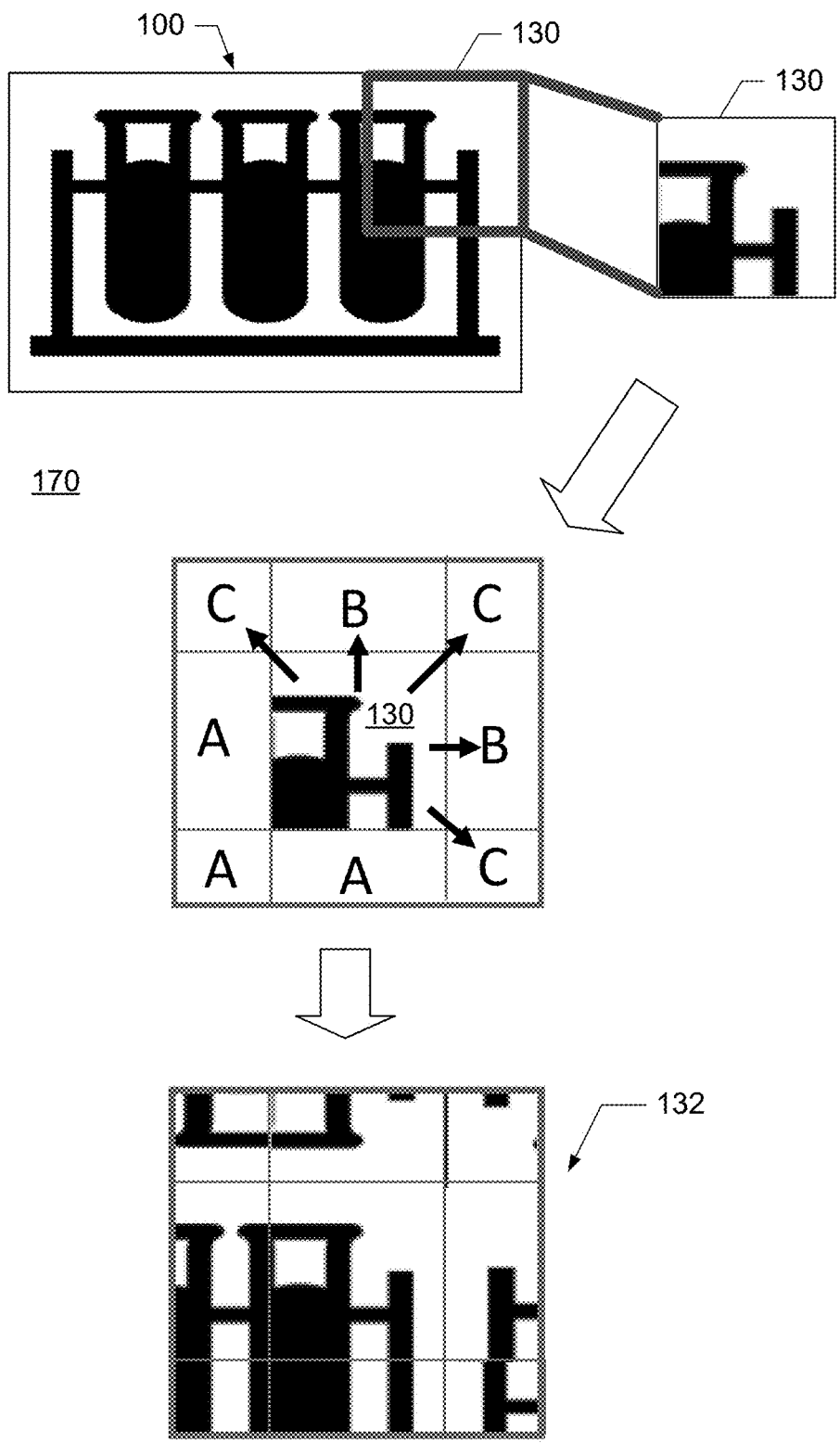
FIG. 2 is a detailed flow diagram illustrating the expansion process (described with respect to FIG. 1B) in accordance with one implementation of the present disclosure.

FIG. 2 is a detailed flow diagram illustrating the expansion process 170 (described with respect to FIG. 1B) in accordance with one implementation of the present disclosure. The illustrated implementation of FIG. 2 shows one sub-picture 130 being expanded with additional padding/pixel regions A, B, C to produce the expanded sub-picture 132. Although FIG. 2 shows the expansion process only for sub-picture 130, the other sub-pictures can be expanded using the same process described here for sub-picture 130.

In one implementation, the additional padding/pixel regions to be added to the sub-picture 130 include eight sub-regions (e.g., two sides, top and bottom, and four corners). In this implementation, the eight sub-regions are classified into 3 types of pad designs (e.g., A, B, C).

In one example, the type A pad design is used for sub-regions that are within the active picture area 100. Thus, the type A pad design is formed by extending the image area to the four directions. In FIG. 2, the type A pad design is used for the left sub-region, the bottom sub-region, and the bottom left corner sub-region. Accordingly, the expanded sub-picture 132 shows those sub-regions (i.e., the left sub-region, the bottom sub-region, and the bottom left corner sub-region) being formed by extending the image area to the four directions.

In another example, the type B pad design is used for sub-regions that are not within the active picture area 100 but are in an edge (e.g., left, right, top, or bottom). Thus, the type B pad design is formed using a butterfly image over the edge. In FIG. 2, type B pad design is used for the top sub-region and the right sub-region, which are not in the active picture area 100 and are not in any of the corners. Accordingly, the expanded sub-picture 132 shows those sub-regions (i.e., the top sub-region and the right sub-region) being formed using the butterfly image over the edge. As can be deduced from FIG. 2 and the ordinary definition of the term "butterfly image", the phrase "formed using a butterfly image over the edge" is defined as forming a sub-picture including at least first and second sub-regions by copying and mirroring the first sub-region into the second sub-region along a line of symmetry formed by the edge and concatenating the first and second sub-regions.

In another example, the type C pad design is used for sub-regions that are not within the active picture area 100 but are in a corner (e.g., top left corner, top right corner, bottom left corner, or bottom right corner). Thus, the type C pad design is formed using a butterfly image over the corner point. In FIG. 2, type C pad design is used for the top left corner sub-region, the top right corner sub-region, and the bottom right corner sub-region, which are not in the active picture area 100 and are in the corners. Accordingly, the expanded sub-picture 132 shows those sub-regions (i.e., the top left corner sub-region, the top right corner sub-region, and the bottom right corner sub-region) being formed using the butterfly image over the corner point. As can be deduced from FIG. 2 and the ordinary definition of the term "butterfly image", the phrase "formed using a butterfly image over the corner point" is defined as forming a sub-picture including at least first and second sub-regions by copying and mirroring the first sub-region into the second sub-region over a point of symmetry formed by the corner point and concatenating the first and second sub-regions.

Figure 3:
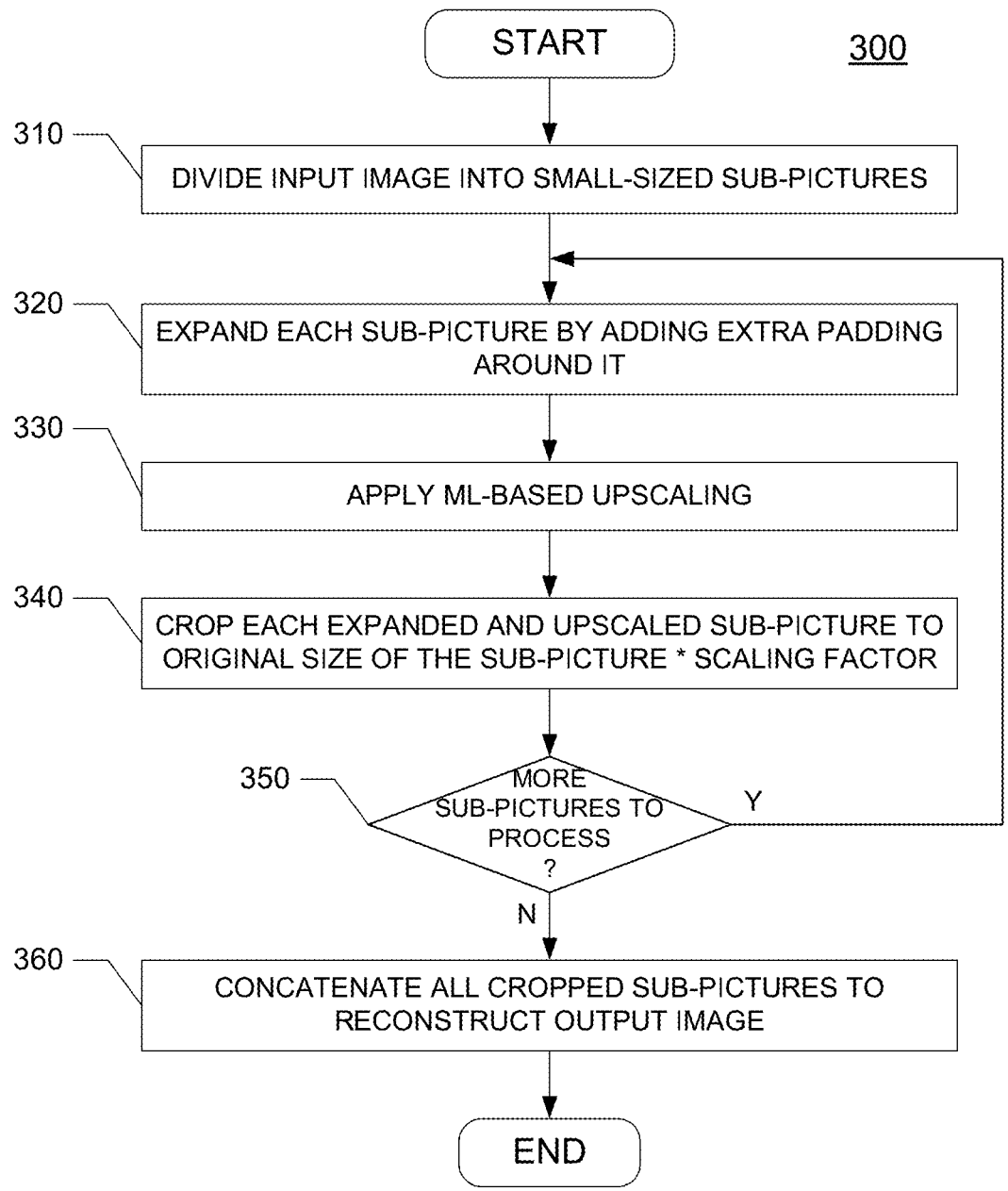
FIG. 3 is a flow chart illustrating a process for training and upscaling a large-sized image in accordance with one implementation of the present disclosure.

FIG. 3 is a flow chart illustrating a process 300 for training and upscaling a large-sized image in accordance with one implementation of the present disclosure. In the illustrated implementation of FIG. 3, a large-sized input image is divided, at block 310, into multiple small-sized sub-pictures. FIG. 1A shows one example of a large-sized input image 100 divided into six small-sized sub-pictures 110, 120, 130, 140, 150, 160.

At block 320, each sub-picture is expanded using target padding pixels around the sub-picture. In one implementation, the expansion process includes adding extra padding/pixels around each sub-picture to produce an expanded sub-picture. The details of how the extra padding/pixels are added to each sub-picture are illustrated in a flow diagram shown in FIG. 2 and in a flow chart shown in FIG. 4.

In one implementation, each padded sub-picture is fed into an ML-based upscaling processor (e.g., a neural network), at block 330, to produce an upscaled padded sub-picture. Each upscaled and padded sub-picture is cropped, at block 340, to the original size of the sub-picture multiplied by the upscaling factor. If it is determined, at block 350, that there are more sub-picture(s) to be processed, then the process 300 is directed to block 320 to process more sub-picture(s). All cropped sub-pictures are concatenated, at block 360, to reconstruct the output image.

Figure 4:
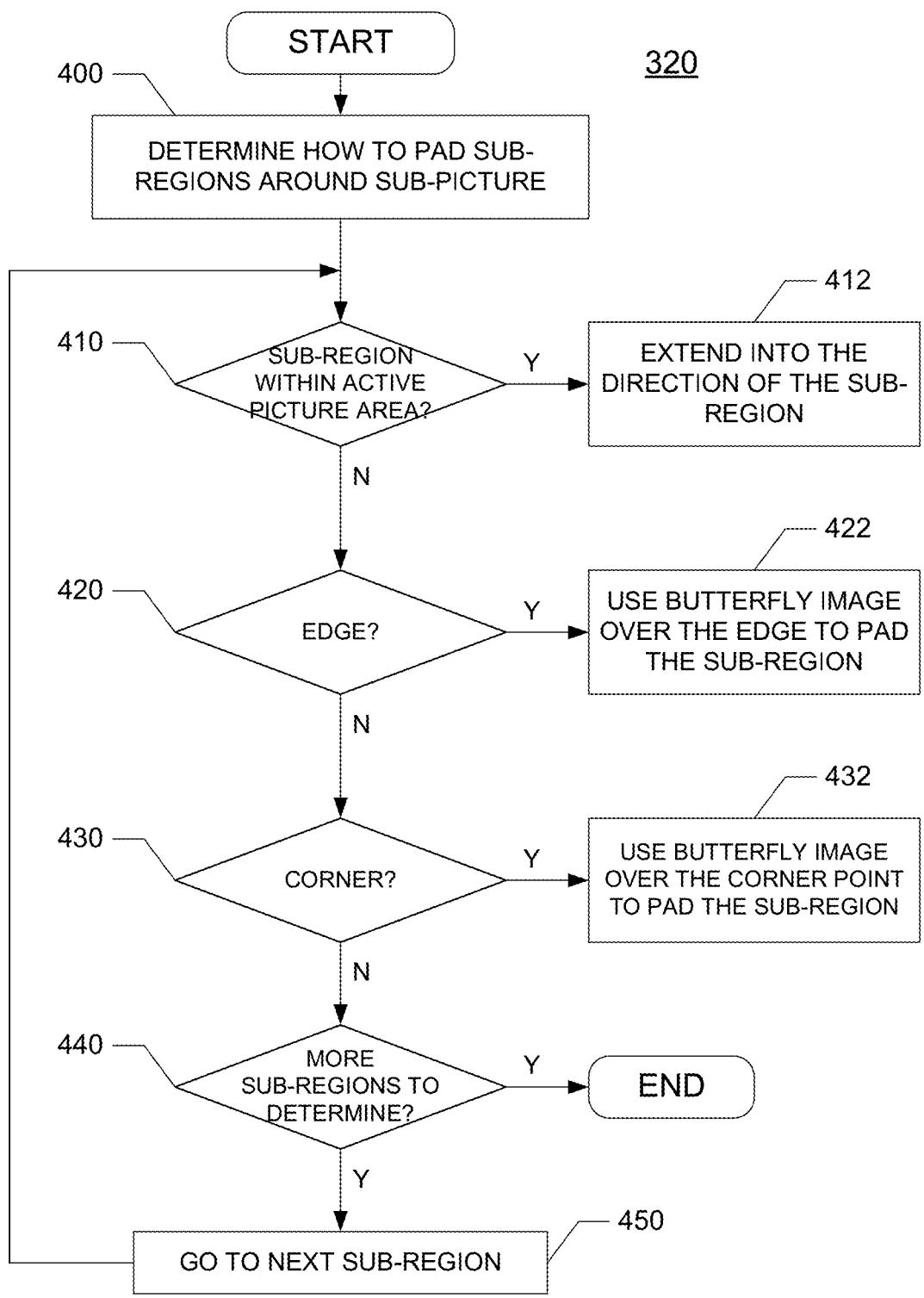
FIG. 4 is a detailed flow chart illustrating a padding process in accordance with one implementation of the present disclosure.

FIG. 4 is a detailed flow chart illustrating a padding process (block 320 in FIG. 3) in accordance with one implementation of the present disclosure. In the illustrated implementation of FIG. 4, a determination is initially made, at block 400, as to how to pad the pixels around a sub-picture. In one implementation, the pixels to be padded around the sub-picture are grouped into a plurality of sub-regions (types A, B, and C).

In the illustrated implementation of FIG. 4, the pixels to be padded are grouped into three sub-regions. Each sub-region to be padded around the sub-picture is checked, at block 410, to determine whether it is a first type (e.g., Type A in FIG. 2), wherein the sub-region is within the active picture area (e.g., 100 in FIG. 1A). The image area of the sub-picture is then extended into the direction of the sub-region, at block 412, if the sub-region is within the active picture area.

Otherwise, if the sub-region is determined, at block 420, to be outside of the active picture area, but is in an edge (e.g., Type B in FIG. 2), the sub-picture is padded using a butterfly image over the edge, at block 422. As indicated above, the type B pad design is used for the top sub-region and the right sub-region, which are not in the active picture area and are not in any of the corners.

Otherwise, if the sub-region is determined, at block 430, to be outside of the active picture area, but is in a corner (e.g., Type C in FIG. 2), the sub-picture is padded using a butterfly image over the corner point, at block 432. As indicated above, the type C pad design is used for the top left corner sub-region, the top right corner sub-region, and the bottom right corner sub-region, which are not in the active picture area and are in the corners.

If it is determined, at block 440, that there are more sub-regions to process, then the process moves to the next sub-region, at block 450, and reverts back to block 410. Otherwise, the process terminates.

Although blocks 410, 420, 430 of process 320 in FIG. 4 are laid out in a particular order, the blocks can be performed in any order without affecting the outcome of the process 320.

Figure 5:
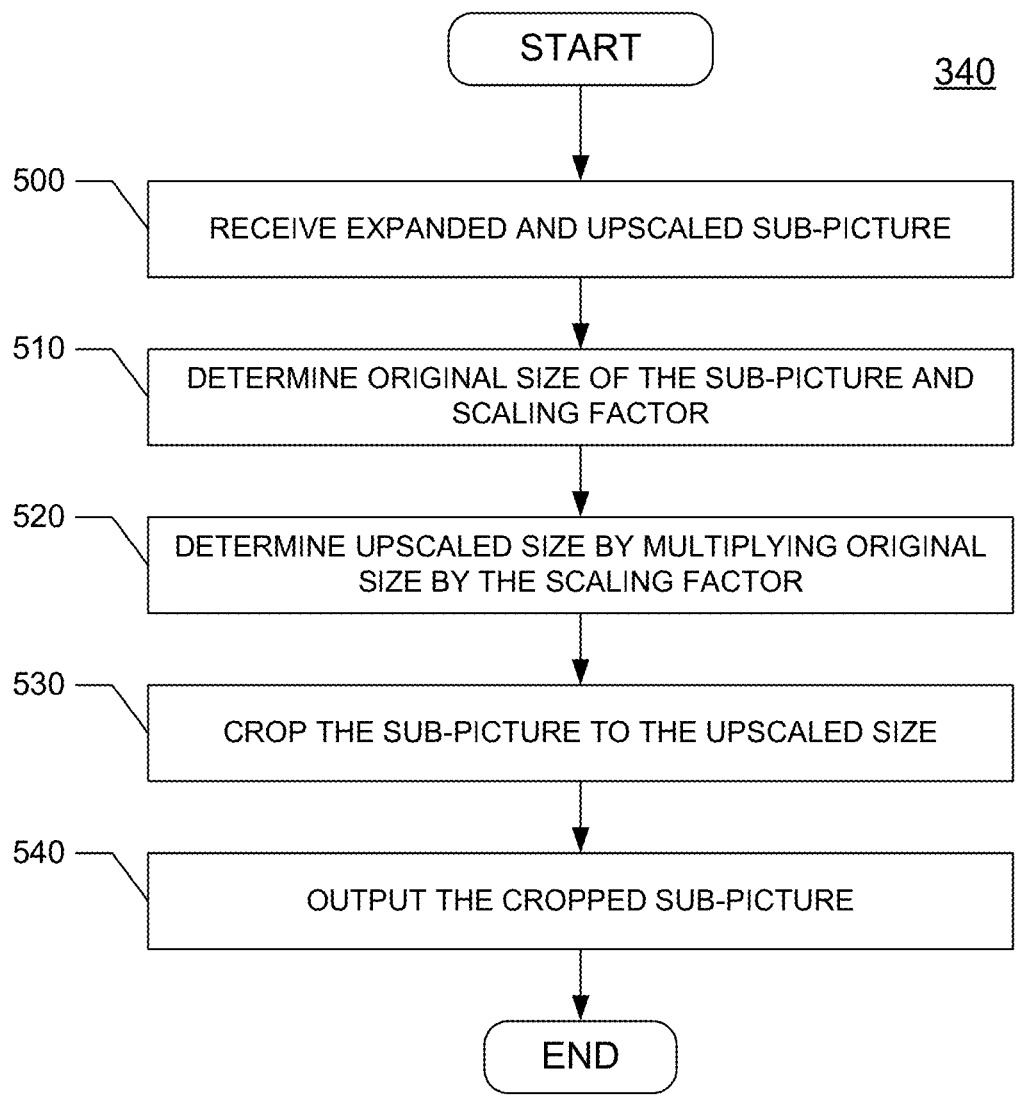
FIG. 5 is a detailed flow chart illustrating a cropping process in accordance with one implementation of the present disclosure.

FIG. 5 is a detailed flow chart illustrating a cropping process (block 340 in FIG. 3) in accordance with one implementation of the present disclosure. In the illustrated implementation of FIG. 5, the expanded and upscaled sub-picture is received, at block 500. The original size of the sub-picture and the upscaling factor are determined, at block 510. The upscaled size is then determined, at block 520, by multiplying the original size by the upscaling factor. The sub-picture is cropped to the upscaled size, at block 530. The cropped sub-picture is output, at block 540.

Figure 6:
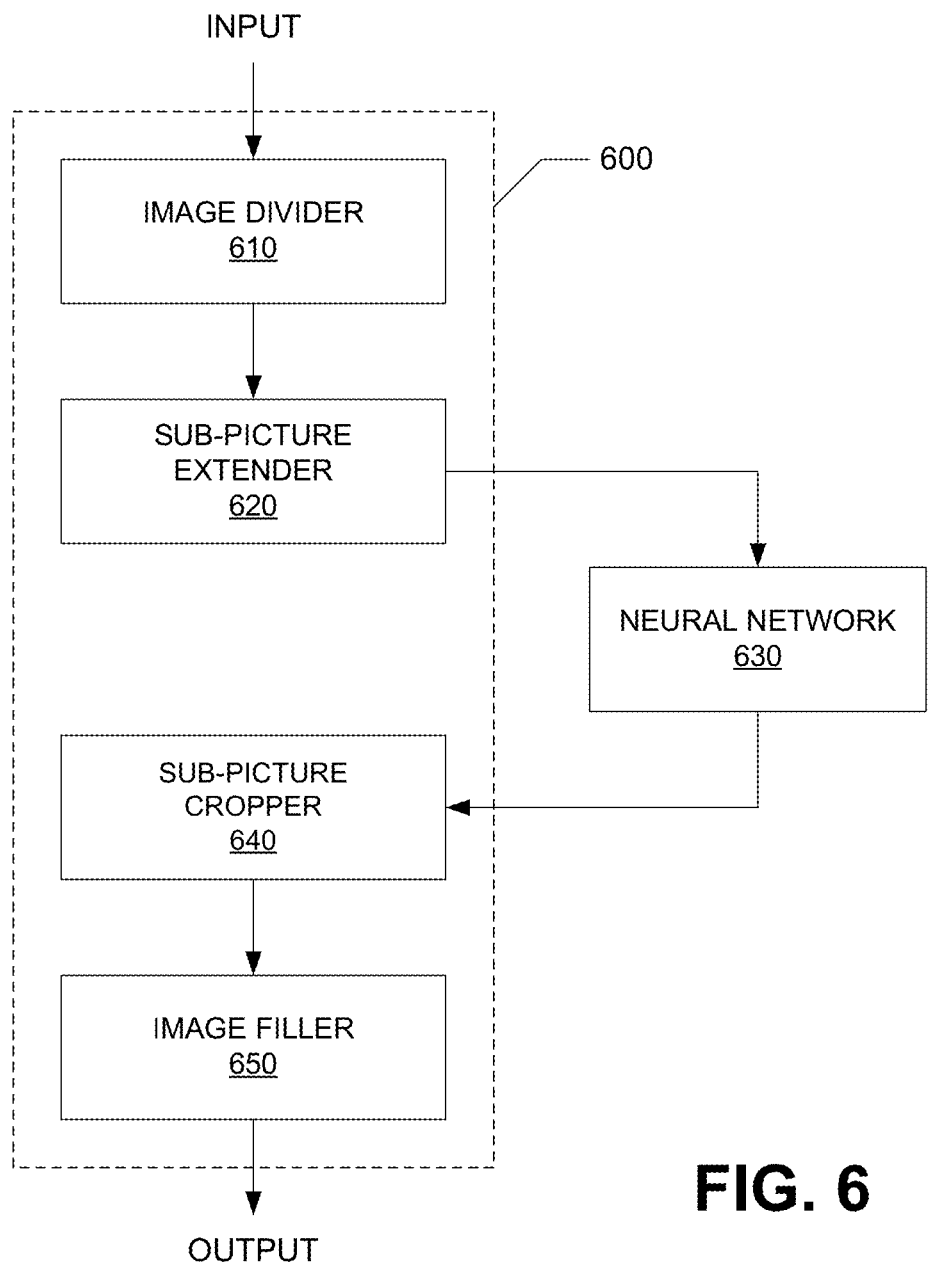
FIG. 6 is a block diagram showing a large-sized image upscaling system in accordance with one implementation of the present disclosure.

FIG. 6 is a block diagram showing a large-sized image upscaling system 600 in accordance with one implementation of the present disclosure. In the illustrated implementation of FIG. 6, the large-sized image upscaling system 600 includes an image divider 610, a sub-picture extender 620, a sub-picture cropper 640, and an image filler 650.

In the illustrated implementation of FIG. 6, the image divider 610 is configured to divide a large-sized input image into a plurality of small-sized sub-pictures. In one implementation, the large-sized input image is divided into a plurality of small equally-sized sub-pictures. The sub-picture extender 620 is configured to extend the sub-picture by adding extra padding/pixels around it to produce an expanded sub-picture.

In the illustrated implementation of FIG. 6, the expanded sub-picture is fed into an ML-based upscaling processor (e.g., a neural network 630) to produce an expanded and upscaled sub-picture. The sub-picture cropper 640 is configured to crop the expanded and upscaled sub-picture to a size corresponding to the size of the original sub-picture prior to the upscaling process multiplied by the upscaling factor. The image filler 650 is then configured to concatenate all cropped sub-pictures to reconstruct the output image.

In one implementation, the large-sized image upscaling system 600 is a system configured entirely with hardware including one or more digital signal processors (DSPs), general purpose microprocessors, application specific integrated circuits (ASICs), field programmable gate/logic arrays (FPGAs), or other equivalent integrated or discrete logic circuitry. In another implementation, the large-sized image upscaling system 600 is configured with a combination of hardware and software.

Figure 7A:
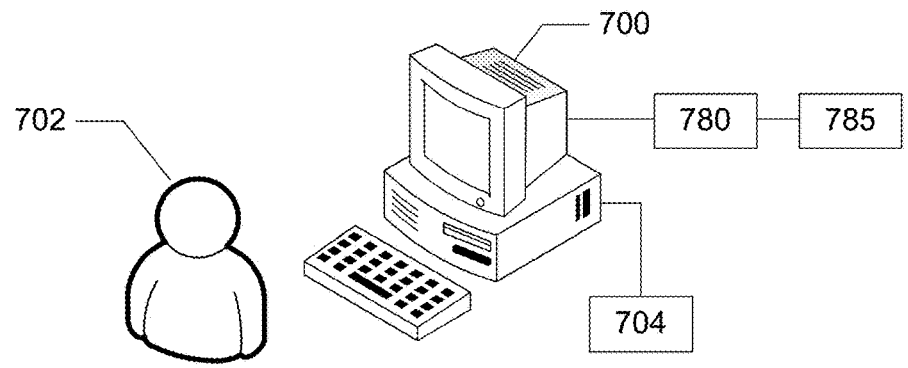
FIG. 7A is a representation of a large-sized image upscaling system and a user in accordance with an implementation of the present disclosure.

FIG. 7A is a representation of a large-sized image upscaling system 700 and a user 702 in accordance with an implementation of the present disclosure. The user 702 uses the computer system 700 to implement an application for frame handling in an upscaling process.

Figure 7B:
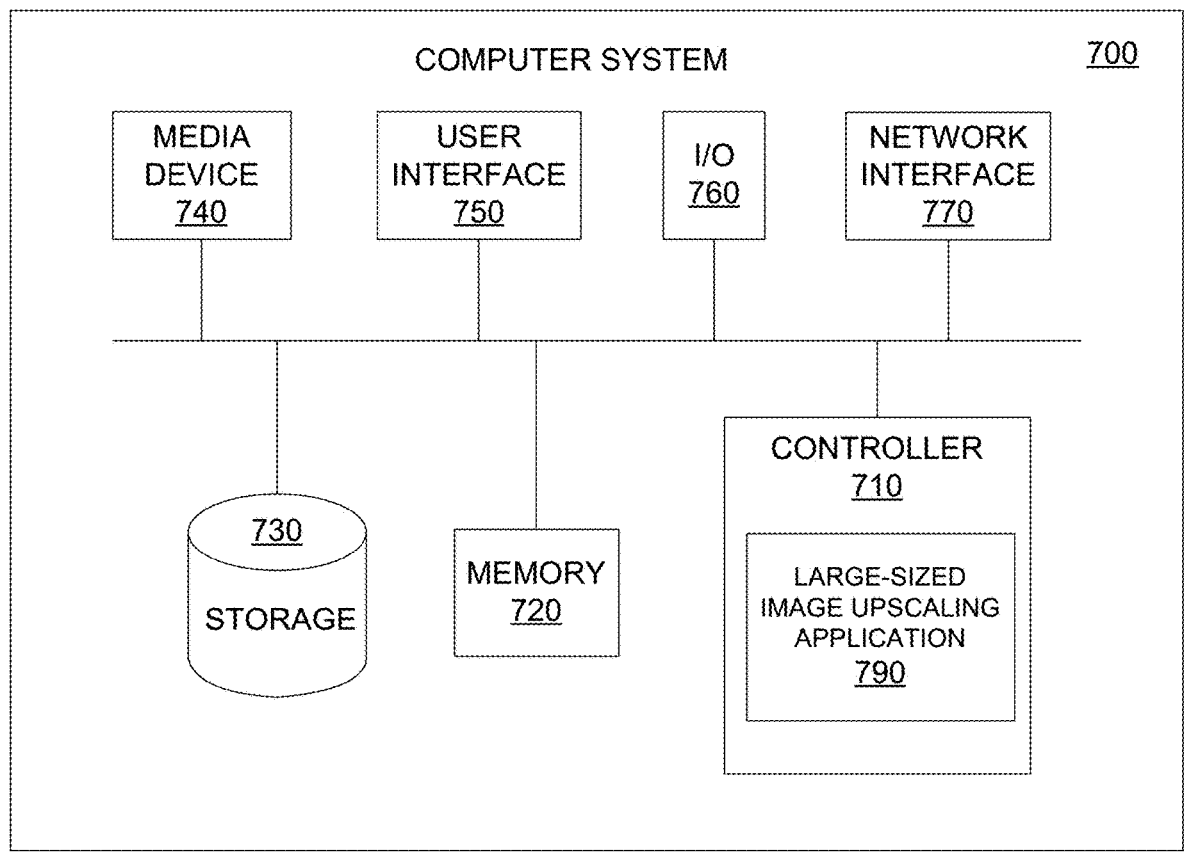
FIG. 7B is a functional block diagram illustrating the computer system hosting the large-sized image upscaling application in accordance with an implementation of the present disclosure.

The computer system 700 stores and executes the large-sized image upscaling application 790 of FIG. 7B. In addition, the computer system 700 may be in communication with a software program 704. Software program 704 may include the software code for the large-sized image upscaling application. Software program 704 may be loaded on an external medium such as a CD, DVD, or a storage drive, as will be explained further below.

Furthermore, computer system 700 may be connected to a network 780. The network 780 can be connected in various different architectures, for example, client-server architecture, a Peer-to-Peer network architecture, or other type of architectures. For example, network 780 can be in communication with a server 785 that coordinates engines and data used within the large-sized image upscaling application. Also, the network can be different types of networks. For example, the network 780 can be the Internet, a Local Area Network or any variations of Local Area Network, a Wide Area Network, a Metropolitan Area Network, an Intranet or Extranet, or a wireless network.

FIG. 7B is a functional block diagram illustrating the computer system 700 hosting the large-sized image upscaling application 790 in accordance with an implementation of the present disclosure. A controller 710 is a programmable processor and controls the operation of the computer system 700 and its components. The controller 710 loads instructions (e.g., in the form of a computer program) from the memory 720 or an embedded controller memory (not shown) and executes these instructions to control the system. In its execution, the controller 710 provides the large-sized image upscaling application 790 with a software system, such as to enable the creation and configuration of engines and data extractors within the large-sized image upscaling application. Alternatively, this service can be implemented as separate hardware components in the controller 710 or the computer system 700.

Memory 720 stores data temporarily for use by the other components of the computer system 700. In one implementation, memory 720 is implemented as RAM. In one implementation, memory 720 also includes long-term or permanent memory, such as flash memory and/or ROM.

Storage 730 stores data either temporarily or for long periods of time for use by the other components of computer system 700. For example, storage 730 stores data used by the large-sized image upscaling application 790. In one implementation, storage 730 is a hard disk drive.

The media device 740 receives removable media and reads and/or writes data to the inserted media. In one implementation, for example, the media device 740 is an optical disc drive.

The user interface 750 includes components for accepting user input from the user of the computer system 700 and presenting information to the user 702. In one implementation, the user interface 750 includes a keyboard, a mouse, audio speakers, and a display. The controller 710 uses input from the user 702 to adjust the operation of the computer system 700.

The I/O interface 760 includes one or more I/O ports to connect to corresponding I/O devices, such as external storage or supplemental devices (e.g., a printer or a PDA). In one implementation, the ports of the I/O interface 760 include ports such as: USB ports, PCMCIA ports, serial ports, and/or parallel ports. In another implementation, the I/O interface 760 includes a wireless interface for communication with external devices wirelessly.

The network interface 770 includes a wired and/or wireless network connection, such as an RJ-45 or "Wi-Fi" interface (including, but not limited to 802.11) supporting an Ethernet connection.

The computer system 700 includes additional hardware and software typical of computer systems (e.g., power, cooling, operating system), though these components are not specifically shown in FIG. 7B for simplicity. In other implementations, different configurations of the computer system can be used (e.g., different bus or storage configurations or a multi-processor configuration).

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. For example, although the above description mentions issues with upscaling large-sized images, the difficulties in upscaling may also include difficulties of upscaling images with more bit depth (e.g., 16-bit depth versus 8-bit depth). Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for training and upscaling a large-sized input image, the method comprising:
dividing the large-sized input image into a plurality of small-sized sub-pictures;
expanding each sub-picture of the plurality of small-sized sub-pictures using target padding pixels to produce an expanded sub-picture;
upscaling each sub-picture using a machine learning-based upscaler to produce an expanded upscaled sub-picture;
cropping the expanded upscaled sub-picture to an upscaled size equal to an original size of each sub-picture multiplied by an upscaling factor;
repeating expanding, upscaling, and cropping for the plurality of sub-pictures; and
concatenating the plurality of cropped sub-pictures to produce an output image.

2. The method of claim 1, wherein expanding each sub-picture comprises:
determining how to pad the extra pixels around each sub-picture; and
adding sub-regions of the extra pixels around each sub-picture.

3. The method of claim 2, wherein adding sub-regions comprises determining a type for each of the sub-regions.

4. The method of claim 3, wherein a first type of the sub-regions comprises
the sub-regions with pixels that are entirely within an active picture area of the large-sized image.

5. The method of claim 4, further comprising
extending each sub-picture into directions of the sub-regions when the sub-regions are determined to be of the first type.

6. The method of claim 3, wherein a second type of the sub-regions comprises
the sub-regions with pixels that are not within an active picture area of the large-sized image but are on edges of each sub-picture.

7. The method of claim 6, further comprising
extending each sub-picture using a butterfly image over the edges when the sub-regions are determined to be of the second type by forming each sub-picture including at least first and second sub-regions by copying and mirroring the first sub-region into the second sub-region along a line of symmetry formed by the edge and concatenating the first and second sub-regions.

8. The method of claim 3, wherein a third type of the sub-regions comprises
the sub-regions with pixels that are not within an active picture area of the large-sized image but are on corners of each sub-picture.

9. The method of claim 8, further comprising
extending each sub-picture using a butterfly image over the corners when the sub-regions are determined to be of the third type by forming each sub-picture including at least first and second sub-regions by copying and mirroring the first sub-region into the second sub-region over a point of symmetry formed by a corner point of the corners and concatenating the first and second sub-regions.

10. A large-sized image upscaling system, comprising:
an image divider configured to divide a large-sized input image into a plurality of sub-pictures;
a sub-picture extender configured to extend each sub-picture of the plurality of sub-pictures by adding extra pixels around each sub-picture to produce an expanded sub-picture,
wherein the expanded sub-picture is fed into a neural network to train and upscale the expanded sub-picture;
a sub-picture cropper configured to receive and crop the expanded and upscaled sub-picture to a size corresponding to the size of an original sub-picture multiplied by an upscaling factor; and
an image filler configured to concatenate all cropped sub-pictures of the plurality of sub-pictures to reconstruct an output image.

11. The system of claim 10, wherein the sub-picture extender adds the extra pixels around each sub-picture by adding sub-regions of the extra pixels around each sub-picture.

12. The system of claim 11, wherein adding sub-regions comprises determining a type for each of the sub-regions.

13. The system of claim 12, wherein in a first type of the sub-regions comprises
the sub-regions with pixels that are entirely within an active picture area of the large-sized input image.

14. The system of claim 13, wherein the sub-picture extender is further configured to extend each sub-picture into directions of the sub-regions when the sub-regions are determined to be of the first type.

15. The system of claim 12, wherein a second type of the sub-regions comprises
the sub-regions with pixels that are not within an active picture area of the large-sized input image but are on edges of each extended sub-picture.

16. The system of claim 15, wherein the sub-picture extender is further configured to extend each sub-picture using a butterfly image over the edges when the sub-regions are determined to be of the second type.

17. The system of claim 12, wherein a third type of the sub-regions comprises
the sub-regions with pixels that are not within an active picture area of the large-sized input image but are on corners of each extended sub-picture.

18. The system of claim 17, wherein the sub-picture extender is further configured to extend each sub-picture using a butterfly image over the corners when the sub-regions are determined to be the third type.

19. A non-transitory computer-readable storage medium storing a computer program to train and upscale a large-sized input image, the computer program comprising executable instructions that cause a computer to:
- divide the large-sized input image into a plurality of small-sized sub-pictures;
- expand each sub-picture of the plurality of small-sized sub-pictures using target padding pixels to produce an expanded sub-picture;
- upscale each sub-picture using a machine learning-based upscaler to produce an expanded upscaled sub-picture;
- crop the expanded upscaled sub-picture to an upscaled size equal to an original size of each sub-picture multiplied by an upscaling factor;
- repeat executable instructions that cause the computer to expand, upscale, and crop the plurality of sub-pictures; and
- concatenate the plurality of cropped sub-pictures to produce an output image.

20. The non-transitory computer-readable storage medium of claim 19, wherein the executable instructions that cause a computer to expand each sub-picture comprise executable instructions that cause a computer to:
- determine how to pad extra pixels around each sub-picture; and
- add sub-regions of the extra pixels.

* * * * *